4,306,716

United States Patent [19] | [11] 4,306,716
James et al. | [45] Dec. 22, 1981

[54] ELECTRONIC GAME HAVING LIGHT GUIDE ARRAY DISPLAY

[75] Inventors: David F. James, Redondo Beach; Elton L. Johnson, Downey, both of Calif.

[73] Assignee: Mattel, Inc., Hawthorne, Calif.

[21] Appl. No.: 113,939

[22] Filed: Jan. 21, 1980

[51] Int. Cl.[3] .......... A63F 9/00; G02B 5/14

[52] U.S. Cl. .......... 273/1 E; 273/85 G; 273/DIG. 7; 340/380; 340/757; 340/762; 350/96.10

[58] Field of Search .......... 273/1 E, 85 G, 237, 273/DIG. 7, 23; 340/752, 756, 757, 762, 380; 350/96.24, 96.28, 96.10

[56] References Cited

U.S. PATENT DOCUMENTS

| | | | |
|---|---|---|---|
| 3,420,949 | 7/1969 | McNaney | 350/96.24 X |
| 3,603,723 | 9/1971 | Tan | 350/96.24 X |
| 3,786,500 | 1/1974 | Fiorletta et al. | 273/1 E X |
| 3,913,872 | 10/1975 | Weber | 350/96.28 X |
| 3,963,327 | 6/1976 | Poirier | 350/96.1 X |
| 4,076,378 | 2/1978 | Cole | 350/96.24 |
| 4,162,792 | 7/1979 | Chang et al. | 273/85 G |
| 4,249,735 | 2/1981 | Bromley | 273/85 G X |

*Primary Examiner*—William H. Grieb
*Attorney, Agent, or Firm*—John G. Mesaros; Max Shirk; Ronald Goldman

[57] ABSTRACT

An electronic amusement apparatus having control electronics selectively energizing one or more of the segments of an array of illuminatable segments, with a unitary light control member having an array of portions in overlying relation with each of the segments. Each portion may be identically configured with the exit ends of all portions being in generally planar relation adjacent a transparent or diffused viewing surface. Each portion includes a peripheral wall defining a tapered aperture with the exit end of the aperture configured to provide the visual appearance of a desired object on the viewing surface. Light rays from the illuminated segment pass through the entrance end of the aperture and are internally reflected by the tapered walls toward the exit end while simultaneously light from the segment passes through the peripheral wall to provide a sharply defined edge for the viewed object.

16 Claims, 5 Drawing Figures

ELECTRONIC GAME HAVING LIGHT GUIDE ARRAY DISPLAY

BACKGROUND OF THE INVENTION

The background of the invention will be discussed in two parts:

1. Field of the Invention

This invention relates to electronic games, and more particularly to an electronic game having illuminatable segments viewable by the operator of the game.

2. Description of the Prior Art

With the introduction of microprocessor technology, electronic games utilizing microprocessors have become increasingly popular. Such electronic games may be in the form of handheld electronic games with one or more buttons manually operable by an operator with the game being depicted in a display area. Such display areas usually take the form of a playing field which is imprinted on a colored transparent plastic surface. Beneath this surface there are a plurality of illuminatable segments such as light emitting diodes. The segments of a light emitting diode array are generally rectangular or square and the display surface as viewed by the operator displays rectangles or squares as the controllable playing pieces or indicia. The illuminated segments viewed by the operator may be operator controlled or microprocessor controlled but in either event, the indicia so viewed by the operator generally conforms to the shape of the segments, the illumination of which is controlled by the microprocessor.

With segmented displays, the light emitting diode segments are usually formed or affixed to a substrate which is generally a printed circuit board with the diode segments positioned to provide the array as desired. For some game applications, it may be desirable to have larger segments or segments of a configuration different from the conventional rectangular or square segments. However, for such applications the cost of the light emitting diode array increases correspondingly or requires custom engineering, design and fabrication.

One attempt to enlarge the visual appearance on the display surface of rectangular illuminatable segments has been made in electronic games produced by Bandai Co. Ltd. of Japan. In order to enlarge the visual appearance in such games made by Bandai, each segment is positioned at the center of a reflector element, the reflector element being similar in principal to that found in a conventional battery-operated flashlight with the exception that the Bandai reflector element is rectangular to conform to the rectangular nature of the light emitting diode segment. The visual appearance on the display surface is thus an enlarged rectangle.

Light guides or light pipes have been used in different applications for directing light from a light source to an ultimate viewing area. Such uses are shown and described for example in U.S. Pat. Nos. 3,420,949; 3,603,723; and 4,076,378. Such uses include message character display, color television cameras and fiber optic arrays in each of these patents respectively.

It is an object of the present invention to provide a new and improved electronic game display apparatus.

It is another object of the present invention to provide a new and improved electronic game having illuminatable segments of rectangular or square configuration viewed by the operator at a display surface as an object different in shape from the illuminatable source.

SUMMARY OF THE INVENTION

The foregoing and other objects of the invention are accomplished by providing an electronic game having control electronics receiving signals from manually operable switches actuable by an operator for controlling at least in part a visual display on a display surface of the game. The display surface is a generally planar diffuser in generally parallel relation with a planar array of illuminatable segments such as light emitting diode elements, the elements being rectangular or square in form. Interposed between the element array and the viewing surface is a light control member having an array of portions in overlying relation with each of the segments. Each portion is generally identically configured and provided with a peripheral wall defining a tapered aperture having an entrance end an exit end, the exit end being configured to provide the desired game object on the viewing surface. The entrance ends of each portion are positioned in proximate relation to the adjacent illuminatable segment which is at the axial center line of the portion. The exit ends of the portions are in generally planar relation in proximate spaced relation to the display or viewing surface. Light rays emitted from an illuminated segment are internally reflected within the aperture toward the exit end while other light rays pass through the peripheral sidewall in the manner of a light pipe to provide a sharply defined edge on the display surface. In the embodiment illustrated, the exit ends are larger than the entrance ends with the light control member portions providing a visual display of an enlarged generally circular dot on the viewing surface.

Other objects, features and advantages of the invention will become apparent from a reading of the specification when taken in conjunction with the drawings in which like referenced numerals refer to like elements in the several views.

DESCRIPTION OF THE PREFERRED EMBODIMENT

Figure 1:
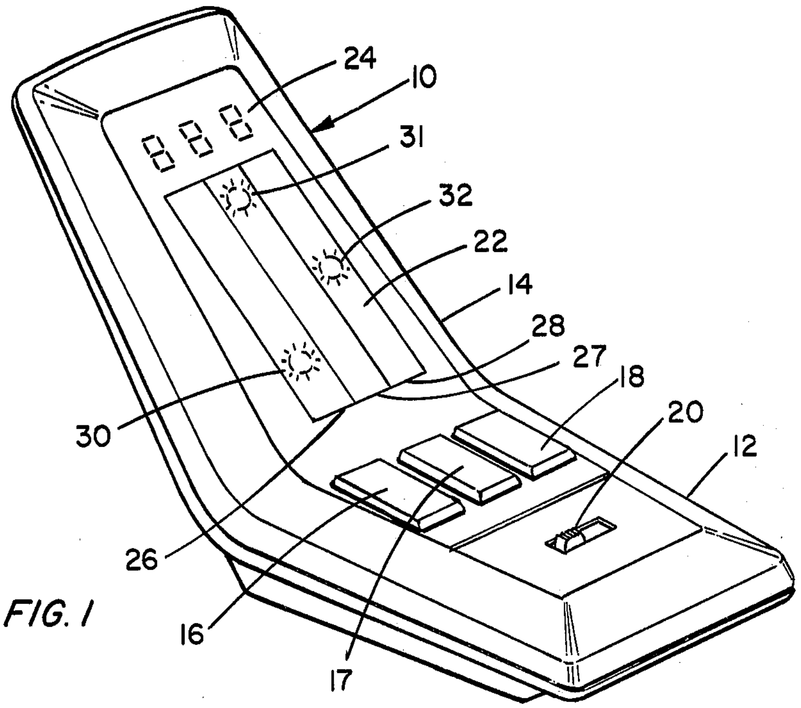
FIG. 1 is a perspective view of an electronic game incorporating the invention.

Referring now to the drawings and particularly to FIG. 1, there is shown an electronic game generally designated 10, the housing of which is configured to have a base portion 12 configured for resting on a surface with an upwardly and angularly extending portion 14. The base portion 12 is provided with three buttons or switches 16–18 and may optionally include an "on-off" switch 20. The switches 16–18 are generally identically configured and aligned side by side, these switches being operator controllable.

The angularly extending portion 14 is provided with a display surface viewable by the operator, the display surface including a playing field display 22 and a score display area 24. The playing field display 22 is generally rectangular in form and is depicted in FIG. 1 as being divided into three vertical columns for purposes of description. The three columns are identified by reference numerals 26–28 and are aligned respectively with the switches 16–18. That is, the left switch 16 can be used to control game objects or indicia and the leftmost column 26, the switch 17 controlling the play in the center column 27 and the switch 18 controlling the play in the right hand column 28. Depicted in each of the columns 26–28 are illuminated indicia 30–32 respectively, these indicia being in the form of large round dots, these dots being formed in the manner to be hereinafter described by the display portion according to this invention.

The uppermost portion of the display surface includes a three digit scoring display 24 which may be the conventional segmented display of light emitting diodes, liquid crystal or the like. In such electronic games, it is the purpose of the operator by adept manipulation of the switches 16–18 to control an object on the playing field display 22 in accordance with the rules of the game. The objects controlled by the operator take the form of indicia viewable on the playing field display 22, and in the instant application, this viewable indicia takes the form of enlarged objects or dots 30–32. The position of these dots on the display 22 may be operator controlled or in part machine controlled.

Figure 2:
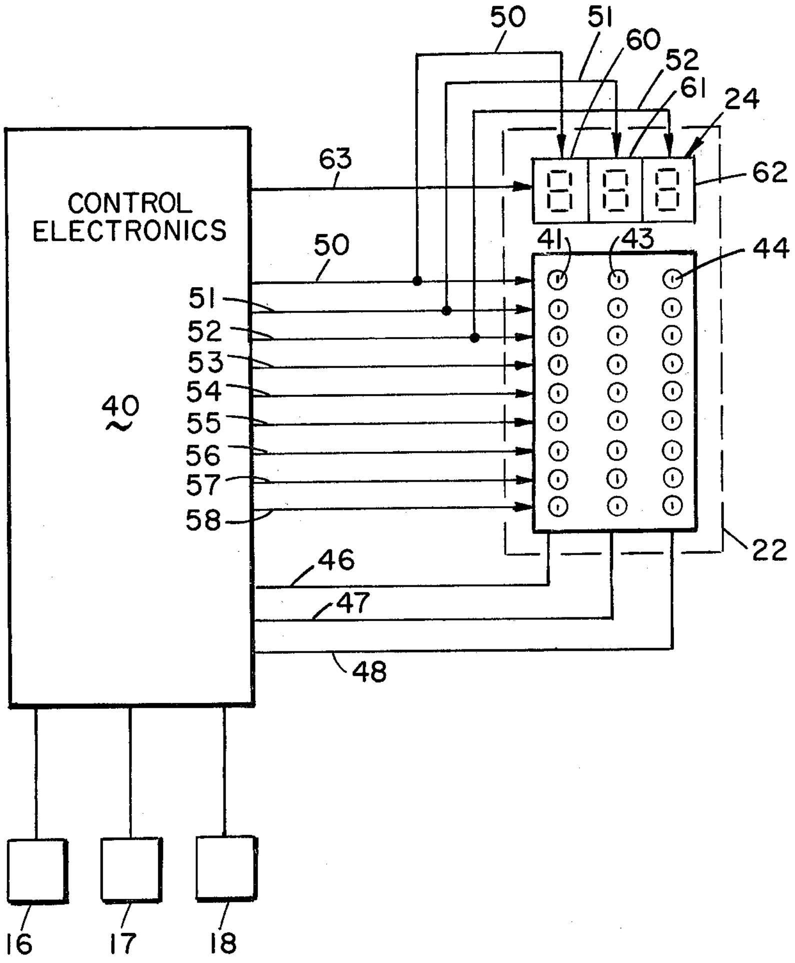
FIG. 2 is a general block diagram of the electronic system of the game of FIG. 1.

Referring now to FIG. 2, there is shown a general block diagram of an electronic system for the game of FIG. 1. The switches 16, 17 and 18, upon depression, provide input signals to the control electronics 40 which may include a microprocessor or other suitable logic circuitry. The outputs of the control electronics 40 are used to energize the displays 22 and 24 by means of select outputs for the segments or digits of both. For example, the playing field display 22 is provided with three rows of vertically oriented light emitting diode segments shown as vertical dashes surrounded by circles, there being three rows of nine each of the diode segments 42, 43 and 44 (only one each of which is numbered). The alignment of the segments is in both vertical and horizontal orientation as viewed in FIG. 2, the vertical row of segments 42 corresponding to the vertical column 26 on the playing field display 22, with segments 43 and 44 being those segments for the other columns 27 and 28 respectively.

For energization of the light emitting diode segments in a particular column, the control electronics 40 is provided with three output leads 46–48 which are segment select outputs. A second set of outputs are the "digit select" outputs, there being nine leads 50–58, each of which energizes a particular horizontal row of diode segments. As is conventional, the illumination of a particular diode 42, for example, would result with an output pulse coincidence appearing on segment select lead 46 and digit select lead 50. It is to be understood, however, that more than one diode segment may be illuminated simultaneously by appropriate output pulses determined by the control electronics 40 appearing on any number of the digit select leads 50–58 coinciding with one or more output pulses on the segment select leads 46–48.

Digit select leads 50, 51 and 52 are also electrically coupled to the digit locations 60–62 of the three digit numeric display or scoring display 24. The segment select for these three digits is provided by a single output bus 63 commonly coupled electrically to each of the three digit locations 60, 61 and 62. In the event it is desired to display numbers on the scoring display 24 during operation of the game, appropriate timing control is effected within the control electronics 40 so that energization of the digit select leads 50–52 for the numeric or scoring display 24 is not effected simultaneously with illumination of the segments 42–44 on the playing field display 22, these electrical operations occurring sufficiently rapidly to provide a visual effect of a continuous display on both displays 22 and 24.

The specific details of the electronic game rules are not required for a full understanding of the invention. However, in this particular game each of the light emitting diode segments 42–44 when energized in proper sequence will be displayed to the operator as large round dots, these dots being depicted symbolically in FIG. 2.

Figure 3:
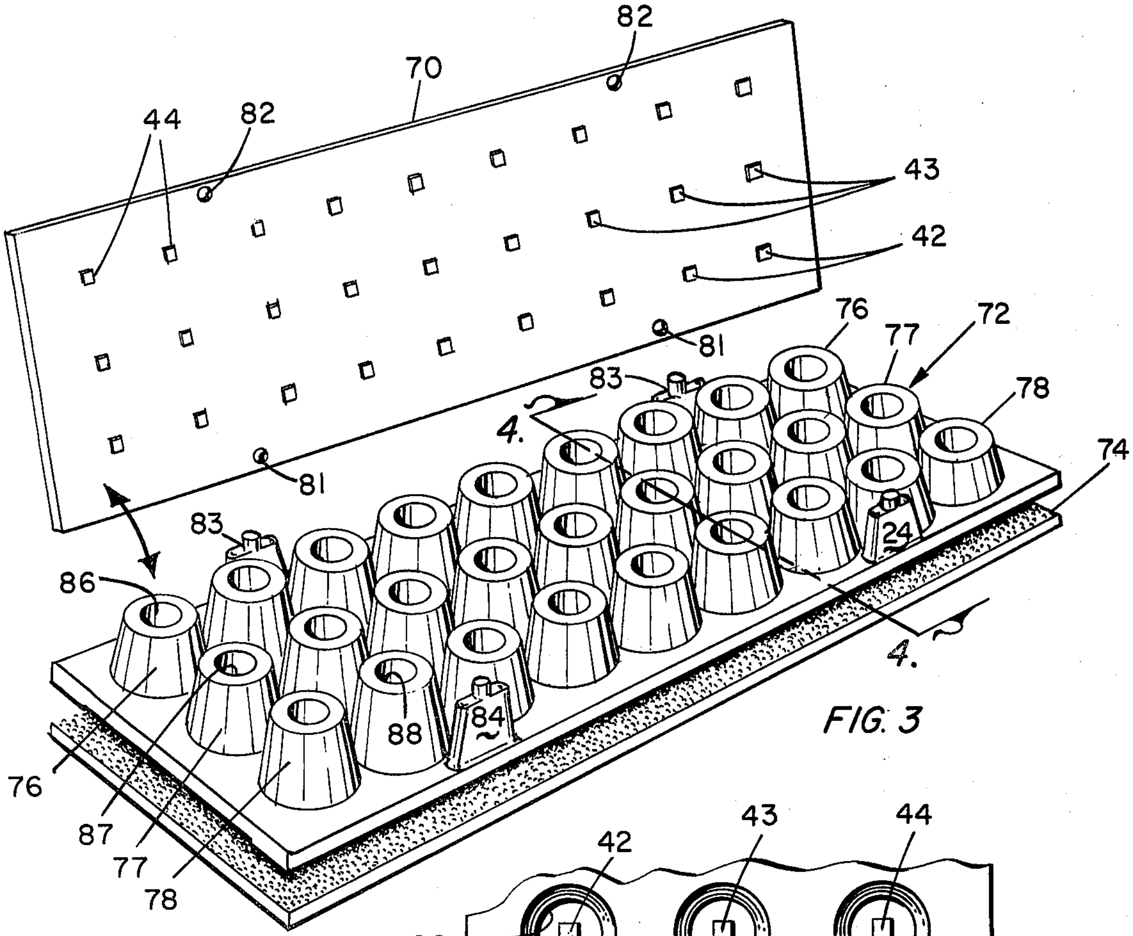
FIG. 3 is an exploded perspective view of the portions of the display system for use in the game of FIG. 1.
Figure 5:
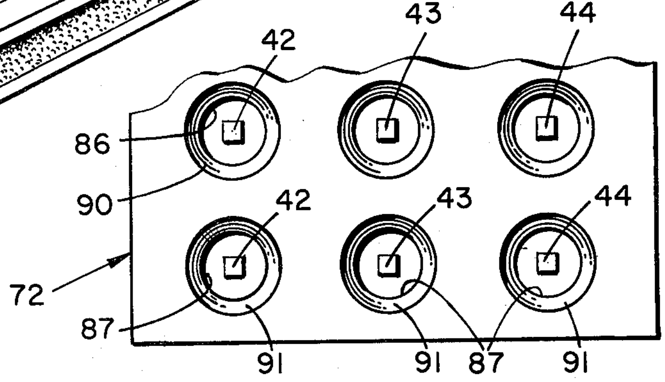
FIG. 5 is a partial plan view of a portion of the display system of FIG. 3 as viewed generally along line 5—5 of FIG. 4.
Figure 4:
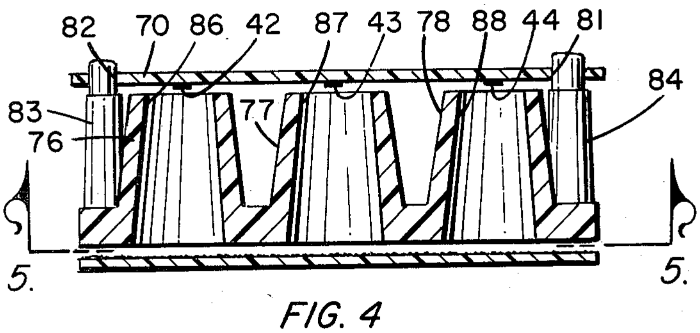
FIG. 4 is a cross-sectional view of the assembled display system as viewed generally along line 4—4 of FIG. 3.

The means of altering the configuration to the viewer of the light emitting diode segments 42–44 from a square or rectangular configuration to a large round dot can best be understood by references to FIGS. 3–5 inclusive. In FIG. 3, the main components of the display subassembly are illustrated, this display subassembly being used for the playing field display 22. For ease of illustration, the display subassembly is shown upside down. The three main components are the printed circuit board 70 having the three rows of light emitting diode segments 42–44 thereon. In conventional assembly, the light emitting diode segments are appropriately positioned on a substrate which is conventionally a printed circuit board which is also provided with conductive strips interconnecting the appropriate segments with the other ends of the conductive strips terminating adjacent an edge of the board for interconnections or alternatively terminating at interconnection pads. For ease of illustration, the conductive strips of the conventional printed circuit board have been eliminated. The segments thus affixed to the printed circuit board 70 provide an array of illuminatable segments in an appropriate pattern consistent with the game. The other components of the display subassembly include a light control member 72 and a generally transparent viewing surfaces which may be a diffuser member 74.

The light control member 72 is formed in one piece as a unitary member of a plastic material such as acrylic material having certain light transmitting and light reflecting properties. The material selected has the property of acting as a light pipe for the solid portions for light entering the solid portion at the correct angle. For internal walls surrounding the illuminatable elements or segments 42–44, the material selected has light reflecting properties. These properties will be discussed more fully hereinafter with respect to the function performed by the light control member 72.

The member 72 has a generally planar portion with an array of light control portions which bear reference numerals 76, 77 and 78, with each reference numeral denoting each of the nine light control portions in a given column. The positioning of the array of light control portions is determined by the pattern for new playing field display 22, and in the embodiment illustrated there are three columns of nine each of the light guide portions 76–78 which, in the assembled position are in overlying relation with the three columns of light emitting diode elements or segments 42–44, respectively, with the diode segments being positioned at the axial center lines of the light control portions 76–78.

Referring also to FIGS. 4 and 5, each of the light control portions 76–78 is generally identically configured and, as shown, is frusto-conical in form or, generally funnel-shaped. The light guide portions 76–78 are provided with a peripheral wall defining a tapered aperture interposed between the light emitting diode segments 42–44 and the viewing surface 74. Opposite surfaces of the light control member 72 are in generally parallel relation. The small diameter end of the light control portions will be referred to as the entrance ends (being adjacent the illuminatable segments) with the large diameter ends being referred to as the exit ends (being adjacent the viewing surface). As best illustrated in FIG. 4, the printed circuit board 70 is provided with alignment apertures, two of which are shown and designated by reference numerals 81 and 82, these apertures being configured for receiving therein the small ends of support legs 83 and 84 (of which there are two pairs). The support legs 83 and 84 are configured and dimensioned for maintaining the plane of the entrance ends of the light control portions 76–78 in proximate parallel relation with the light emitting diode segments 42–44 with the diode segments along the axis of the light control portions 76–78. The apertures extending through the light control portions are provided with entrance apertures 86–88 of a smaller diameter than the exit apertures 90–92. The angle of taper of the apertures extending through the light guide portions are generally identical and in the embodiment illustrated are approximately 10°. The angle of 10° was selected based on the relative dimensions for the particular application and is not critical since greater or lesser angles may be employed for accomplishing the same result if the spacing between the printed circuit board 70 and the viewing surface or diffuser member 74 is increased. As best illustrated in FIG. 4, the peripheral sidewall of each of the light control portions 76–78 is of a generally uniform thickness from the entrance end to the exit end and with the proper plastic material, this peripheral wall acts as a light pipe. For example, with reference to the light control portion 77 in FIG. 4, the light emitting diode segment 43 is spaced from the edge of the peripheral wall thereof. This spacing permits light rays emanating from an illuminated segment 43 to enter the adjacent edge of the sidewall of the light control portion 77 and in the manner of a light pipe, the rays entering this edge are internally reflected between the inner and outer surfaces of the sidewall and directed toward the viewing surface or diffuser member 74. This light pipe effect provides a sharply defined peripheral image for the game object or indicia viewed by the user on the surface of the diffuser member 74. Simultaneously, other light rays emanating from the illuminated segment 43 are internally reflected within the aperture 91 and directed upwardly and outwardly toward the enlarged exit end 91 of the light control portion 77. The sum total of this control of light is to provide a viewable object or indicia on the generally transparent member 74 conforming in shape to the cross-sectional configuration of the exit end 91 of the light control portion 77. The internal reflective properties through the aperture are in the nature of a light guide effect for light rays emanating from the illuminated segment 43 while the peripheral wall of the light control portion 77 acts as a light pipe. Essentially, the light reflected from the inner surface of the tapered aperture fills in the center of the object or indicia while the light pipe effect sharply defines the edge of the so-viewed indicia. The wall thickness, the aperture angle, and the material are selected to provide substantially uniform intensity at all points of the indicia.

Unitary light control member 72 may be made for example by injection molding thus providing an inexpensive display assembly utilizing existing technology for printed circuit boards and light emitting diode segments of a rectangular or square nature to provide a visual impression of an enlarged shape having a peripheral form significantly enlarged and different from the smaller segment.

While the embodiment illustrated depicts a frusto-conical configuration for the light control portions it is to be understood that the light control portions may have other configurations to provide other visual effects although the cost of manufacture may be more expensive. For example, the inner surface of the peripheral walls of the light control portions 76–78 may be curved rather than tapered and furthermore, the light control portions may be configured so that only the exit end conforms to the ultimately desired shape of the viewable object or indicia. Additionally, the peripheral wall of each light control portion may extend beyond the planar portion of the light control member 72 and may likewise be in abutting relation with the transparent display surface or diffuser member 74. Depending on visual effect, a diffuser surface may not be required and a plastic cover having transparent or translucent qualities may be sufficient. A playing field may be suitably imprinted or embossed on the viewing surface or diffuser member 70 for a particular game.

Furthermore, the illuminatable element in the embodiment illustrated has been described as a generally rectangular light emitting diode segment although it is to be understood that other illuminatable elements may be likewise employed within the scope of the invention. Furthermore, the display subassembly may have the aperture through the light control portions 76–78 configured differently to provide visual appearances of an "X," "O," "+," a star, or any other convenient configuration. Likewise, the exit end may be smaller than the entrance end of the aperture to provide more intense illumination on the viewing surface if desired. Ideally, the light control portions 76–78 should be arranged, configured and shaped relative to the illuminatable source and the viewable surface to provide generally uniform illumination over the area defined by the indicia or object on the viewing surface while providing a generally sharply defined edge.

While there has been shown and described a preferred embodiment, it is to be understood that various other adaptations and modifications may be made within the spirit and scope of the invention.

What is claimed is:

1. In an electronic amusement apparatus, the combination comprising:

a housing;

an array of illuminatable elements within said housing;

electronic control means within said housing coupled to said array for selective energization of said elements;

manually operable switch means for providing inputs to said control means for controlling at least in part the energization of said elements;

a viewing surface on said housing in generally parallel relation with said array of illuminatable elements; and a light control means positioned between said array of elements and said viewing surface, said light control means having an array of light control portions corresponding in number to the number of said elements, each of said light control portions having a peripheral wall defining an aperture extending therethrough with an entrance end and an exit end, said exit end being configured for providing an indicia on the viewing surface conforming to the shape of said exit end, said light control means being formed from a material having light transmitting and light reflecting properties; and means for maintaining the entrance ends of said light control means in spaced proximate relation relative to said array of elements for enabling light rays emanating therefrom to be transmitted through said peripheral wall and to be reflected from the inner surface of said aperture to provide generally uniform illumination of the indicium on said viewing surface.

2. The combination according to claim 1 wherein each of said light control portions is generally identical.

3. The combination according to claim 2 wherein the apertures extending through each of said light control portions are tapered.

4. The combination according to claim 1 wherein each of said light control portions is generally identically configured and each peripheral wall has a generally uniform thickness.

5. The combination according to claim 4 wherein each of said apertures is tapered.

6. The combination according to claim 5 wherein each of said light control portions is generally frustoconical in configuration.

7. The combination according to claim 6 wherein each illuminatable element is positioned relative to its light control portion on the axial center line thereof.

8. The combination according to claim 7 wherein said entrance ends are smaller in diameter than said exit ends for providing an indicium in the form of an enlarged circular dot.

9. In a display subassembly for use in an electronic game or the like, the combination comprising:

a generally planar array of illuminatable elements;

a viewing surface in generally parallel relation with said array of illuminatable elements;

a unitary light control member formed from a material having light transmitting properties positioned between said array of elements and said viewing surface, said member having an array of light control portions corresponding in number to the number of said elements, each of said light control portions having a peripheral wall defining an aperture extending therethrough with each of said apertures having an entrance end and an exit end, said exit end being configured to provide a shape for an indicia viewable on said viewing surface upon illumination of an element; and means for maintaining the entrance ends of said apertures of said light control portions in spaced relation to said elements for enabling light rays emanating therefrom to be transmitted through said peripheral walls and for enabling light rays entering said aperture to be reflected toward said exit ends for providing generally uniform illumination of the indicia on said viewing surface.

10. The combination according to claim 9 wherein said exit ends are larger in area than said entrance ends.

11. The combination according to claim 9 wherein each of said light control portions is generally identically configured.

12. The combination according to claim 11 wherein each of said light control portions is generally frustoconical in form and said exit ends are larger in diameter than said entrance ends for providing indicia viewable as a round dot.

13. The combination according to claim 12 wherein each of said peripheral walls has a generally uniform thickness.

14. The combination according to claim 13 wherein said viewing surface includes a generally transparent member.

15. The combination according to claim 14 wherein said generally transparent member is in spaced proximate relation to said exit ends and the surface of said transparent member adjacent said exit ends is a diffuser surface.

16. The combination according to claim 15 wherein said planar array of illuminatable elements includes a printed circuit board having light emitting diode segments.

* * * * *